United States Patent Office 2,754,510
Patented July 10, 1956

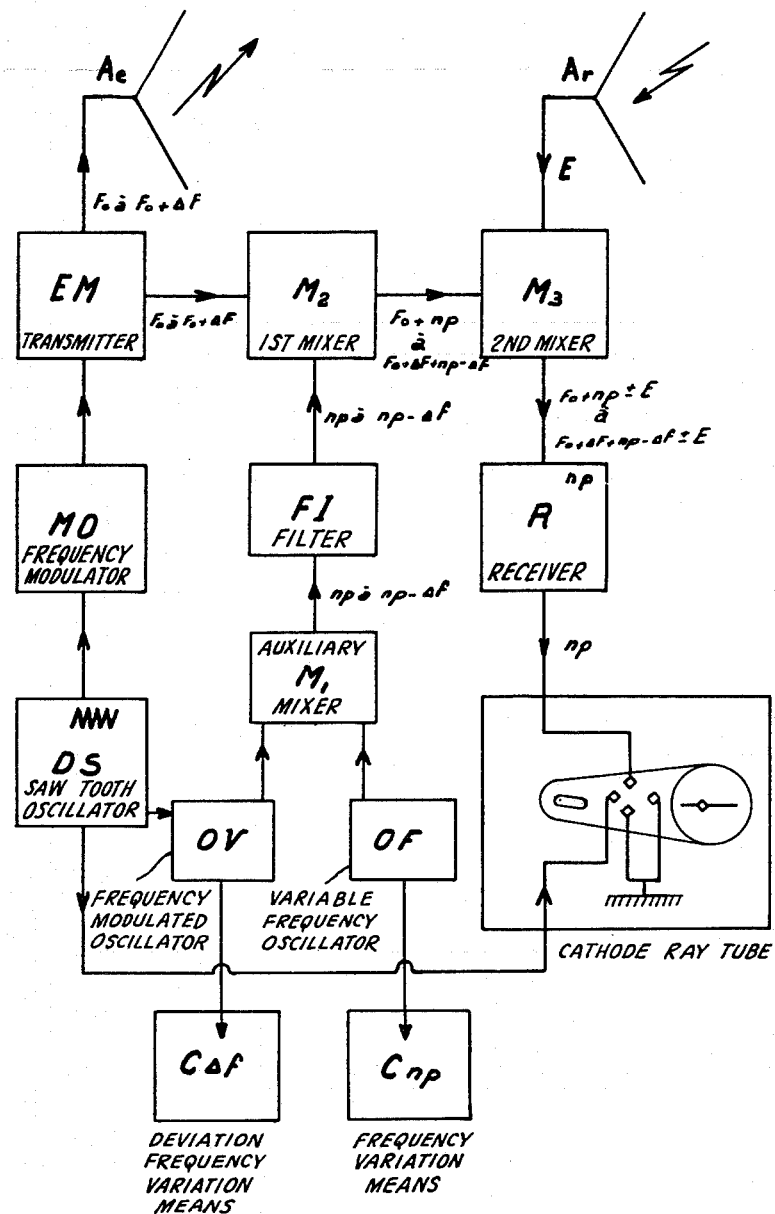

2,754,510

FREQUENCY MODULATED RADAR SYSTEM

Jean Cauchois, Paris, France, assignor to Compagnie Generale de Telegraphie Sans Fil, a corporation of France Application December 12, 1951, Serial No. 261,342

Claims priority, application France December 26, 1950

2 Claims. (Cl. 343—14)

The present invention relates to a frequency modulated radar system, and particularly to radar systems with uninterrupted transmission of the type described in Patent No. 2,632,161, in which the emitted waves are frequency modulated and superposed to the echo waves caused by the reflections of the emitted waves on the obstacles to be detected, the distance of the latter from the point of emission being determined by the frequency of the obtained beats.

Said radar system, which continuously emits waves the frequency of which is modulated between two limiting values $F_0$ and $F_0 + \Delta F$ with a predetermined recurrence, is characterized by the fact that the echoes, arising from the reflection of the emitted waves by the encountered targets, are mixed with a group of oscillations including the oscillations directly emitted by the transmitter, and those of an auxiliary local oscillator which is frequency modulated with the same recurrence as the transmitter between two limiting frequencies $np$ and $np - \Delta f$, the result of this mixture being applied to a receiver tuned to the frequency $np$ and connected to a cathode ray tube indicator, so as to produce vertical straight lines on the screen of the latter each time the received beats have a frequency equal or quite close to $np$, the screen of the cathode ray tube being horizontally swept by a sawtooth voltage at the same recurrence frequency as that of the transmitter or at a multiple of that frequency.

Figure 1:
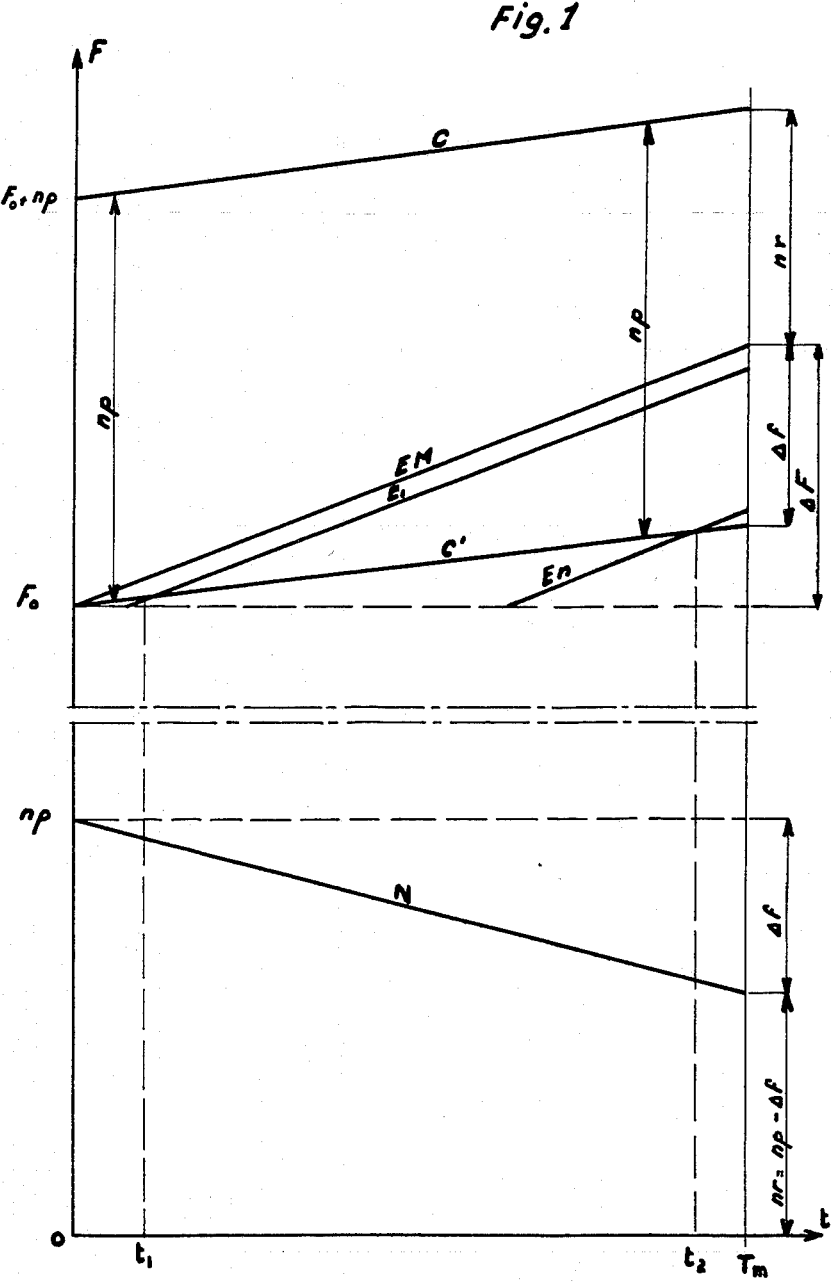

Fig. 1 enclosed, shows graphically how the device described hereinabove operates. The horizontal axis represents the time and the vertical axis the frequencies, the inclined straight line EM shows the frequencies emitted during the period of recurrence $T_m$, the modulation being assumed to be linear in this nonlimiting example. The straight line N shows the frequencies produced by the local oscillator; the straight line C is the algebraic sum of the two straight lines EM and N. Assuming that $E_1$ and $E_2$, respectively, to represent the echo frequencies of the targets nearest to and farthest from, the transmitter, the instants when they produce beats of frequency $np$ are determined by the points of intersection of these straight lines with the straight line C' parallel to C and distant from the latter by the quantity $np$.

The graph shows that these points correspond to the times $t_1$ and $t_2$ and the frequencies of the intermediate targets situated between having the echo frequencies $E_1$ and $E_2$ will therefore fall into in the interval included between $t_1$ and $t_2$, covering almost all the available scale.

In some cases it may be useful to examine a part only of the swept space, and the present invention has as its principal object to provide the means for dividing of the range into fraction.

According to the present invention, the radio electrical system for determining the distance of an object comprises a transmitter; an auxiliary oscillator, both said transmitter and said auxiliary oscillator generating frequency-modulated radio oscillations modulated cyclically as to frequency at the same rate and in synchronism with each other, the cycle of frequency modulation of said transmitter having an increasing frequency, the cycle of modulation of said auxiliary oscillator having a decreasing frequency, the frequency of said transmitter at the beginning of a cycle being much higher than the frequency of said auxiliary oscillator at the same moment; the frequency and the deviation frequency of said frequency modulated oscillations produced by said auxiliary oscillator being adjustable; directive antenna means connected to said transmitter for radiating the modulated waves generated by said transmitter toward the object; receiving means for receiving the waves after reflection by the object; a first mixer connected to the outputs of said transmitter and said auxiliary oscillator for mixing the modulated oscillations of said transmitter with the oscillations of said auxiliary oscillator so as to generate first beat oscillations; a second mixer connected to the output of said first mixer and to said receiving means for mixing the first beat oscillations generated by said first mixer with the oscillations received by said receiving means so as to produce second beat oscillations; a selective receiving means connected to the output of said second mixer and arranged so as to detect among the second beat oscillations those having a frequency substantially equal to the frequency of said auxiliary oscillator at the beginning of the cycle; indicating means for registering the instant at which said receiver detects a beat note having the frequency of said auxiliary oscillator at the beginning of the cycle, and means for measuring the time period separating the last mentioned instant from the beginning of the modulation cycle, said time period being essentially a function of the distance of the object.

Figure 2:
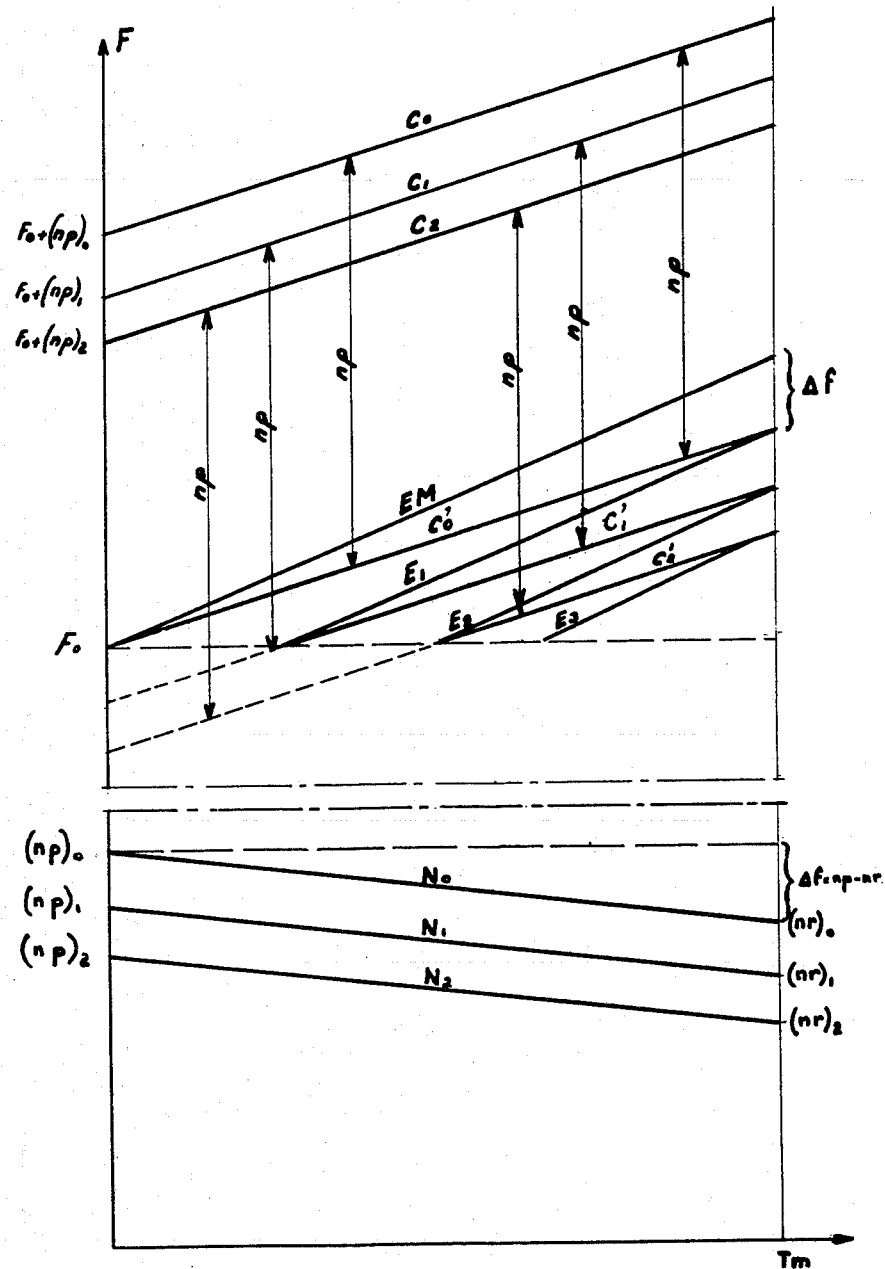

Fig. 2 shows the straight lines $E_1$, $E_2$, and $E_3$ representing the frequencies of three different echoes corresponding for example to targets, respectively, situated at a distance of 15, 26 and 34 kilometers.

If according to the present invention, a local oscillator is available and can be frequency modulated with a displacement $\Delta f$ from three initial values $(np)_0$, $(np)_1$, and $(np)_2$ for example, one can at will explore one of the three regions, respectively, included between 0 and 15, 15 and 26, 26 and 34 kilometers from the transmitter.

If the straight lines of heterodyne beats are $C_0$, $C_1$, $C_2$, the straight lines $C'_0$, $C'_1$, $C'_2$ are traced parallel to the latter with a displacement $np$ equal to the frequency of the beats discernible in the receiver. It will be seen that the straight line $C'_0$ intercepts the space included between $E_m$ and $E_1$ (0 to 15 kms.), the straight line $C'_1$ the space between $E_1$ and $E_2$ (15 to 26 kms.) and finally $C'_2$ covers the interval from $E_2$ to $E_3$ (26 to 34 kms.).

Figs. 1 and 2, besides, show that by increasing the displacement $\Delta f$ of the oscillator, everything else remaining unchanged, the scale of distances is made more narrow and vice versa.

Therefore, the provided means, according to the present addition, allow either to adjust the scale of range or to displace it, or to perform both operations at the same time. Thus, it is possible, at will, to magnify the image of what happens in a given region of space, and thereby to obtain a very great accuracy.

Fig. 3 shows diagrammatically an embodiment of the present invention. In this figure, DS represents a source supplying saw-tooth voltages to the modulator MO and the modulated oscillator OV (termed hereinafter "the second oscillator"). The transmitter EM frequency modulated by the modulator MO feeds an antenna $A_e$, to which it transmits ultra short waves the frequency of which varies periodically between $F_0$ and $F_0 + \Delta F$. The modulated oscillator OV produces oscillations which are frequency modulated with the same recurrence frequency as the transmitter EM, and the displacement $\Delta f$ of that modulation can be adjusted by an outer member accessible to the operator and indicated by the square $C\Delta f$. An oscillator OF, termed hereinafter "the first oscillator," oscillating at constant but adjustable frequency, is provided with an outer adjusting member, indicated by the square Cnp, and allowing to adjust the value of this frequency. The oscillations issued by the two oscillators OV and OF, are mixed in a mixer $M_1$, termed hereinafter "the auxiliary mixer," at the output of which signals appear the frequencies of which vary between $np$ and $np-\Delta f$. These signals are passed through a filter FI to a mixer $M_2$, termed hereinafter "the first mixer" which, besides, is fed with oscillations directly coming from the transmitter EM.

An antenna $A_r$ receives the echoes from the waves emitted by the antenna $A_e$ and reflected by the encountered obstacles and directs them to a mixer $M_3$ (termed hereinafter "the second mixer") this latter receiving also the beats issued from the first mixer $M_2$. A receiver R connected to the second mixer $M_3$ and tuned to the frequency $np$ does not pass any of the beats issued from the second mixer $M_3$ except those the frequency of which is equal or very close to $np$. A cathode ray tube TRC, the screen of which is linearly swept as a function of the time by a saw-tooth voltage issued from the source DS, receives the signals amplified by the receiver R and transforms them into vertical straight lines appearing on the tube screen, thus allowing to localize the echoes on the time scale.

What I claim is:

1. A radio electrical system for determining the distance of an object, comprising in combination, a transmitter; an auxiliary oscillator, both said transmitter and said auxiliary oscillator generating frequency-modulated radio oscillations modulated cyclically as to frequency at the same rate and in synchronism with each other, the cycle of frequency modulation of said transmitter having an increasing frequency, the cycle of modulation of said auxiliary oscillator having a decreasing frequency, the frequency of said transmitter at the beginning of a cycle being substantially higher than the frequency of said auxiliary oscillator at the same moment; means acting upon said auxiliary oscillator for changing the initial frequency of its oscillations; means acting upon said auxiliary oscillator for changing its deviation frequency; directive antenna means connected to said transmitter for radiating the modulated waves generated by said transmitter toward the object; receiving means for receiving the waves after reflection by the object; a first mixer connected to the outputs of said transmitter and said auxiliary oscillator for mixing the modulated oscillations of said transmitter with the oscillations of said auxiliary oscillator so as to generate first beat oscillations; a second mixer connected to the output of said first mixer and to said receiving means for mixing the first beat oscillations generated by said first mixer with the oscillations received by said receiving means so as to produce second beat oscillations; a sharp tuned selective receiving means connected to the output of said second mixer and responsive only to said second beat oscillations having a frequency equal to the frequency of said auxiliary oscillator at the beginning of the cycle; display means for indicating the instant at which said receiver detects a beat note having the frequency of said auxiliary oscillator at the beginning of the cycle; and means for synchronizing said display means with said cyclic frequency modulation.

2. A system as claimed in claim 1, said auxiliary oscillator including a first oscillator having a constant but adjustable frequency, a second frequency modulated oscillator, the deviation frequency of the frequency modulated oscillation produced by said second frequency modulated oscillator being adjustable, and an auxiliary mixer connected to said first and second oscillators and mixing the oscillations generated by said first and second oscillators so as to obtain beat oscillations; and means connected, respectively, to said first and second oscillators for varying the frequency of said oscillator and the deviation frequency of said second oscillator.

References Cited in the file of this patent

UNITED STATES PATENTS

| | | |
|---|---|---|
| 2,451,822 | Guanella | Oct. 19, 1948 |
| 2,505,692 | Staal | Apr. 25, 1950 |
| 2,522,863 | Crosby | Sept. 19, 1950 |
| 2,632,161 | Naday | Mar. 17, 1953 |